June 25, 1940.
G. E. LAMB
2,205,767
CONTINUOUS LAYBOY
Filed July 5, 1938
13 Sheets-Sheet 5
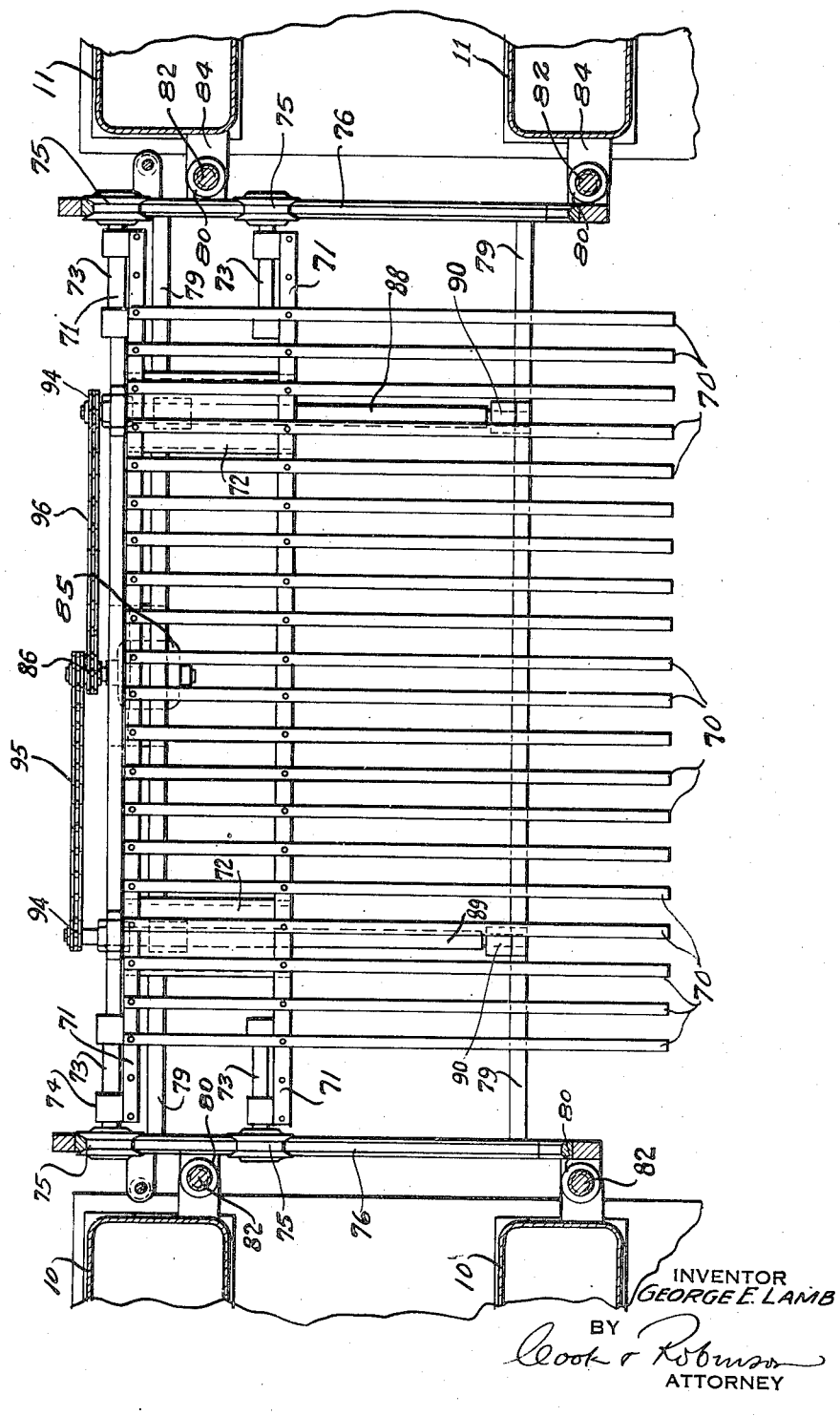
INVENTOR
GEORGE E. LAMB
BY
Cook & Robinson
ATTORNEY

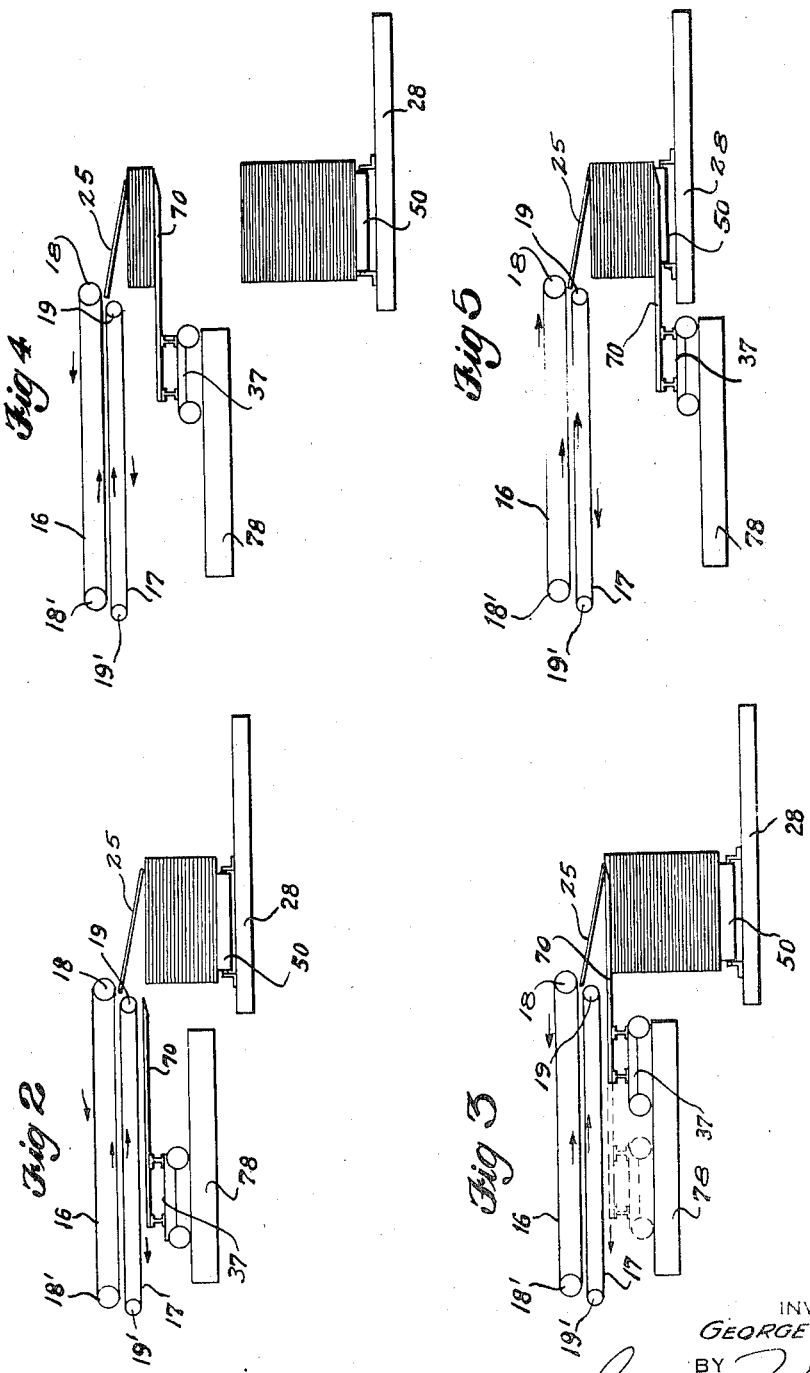

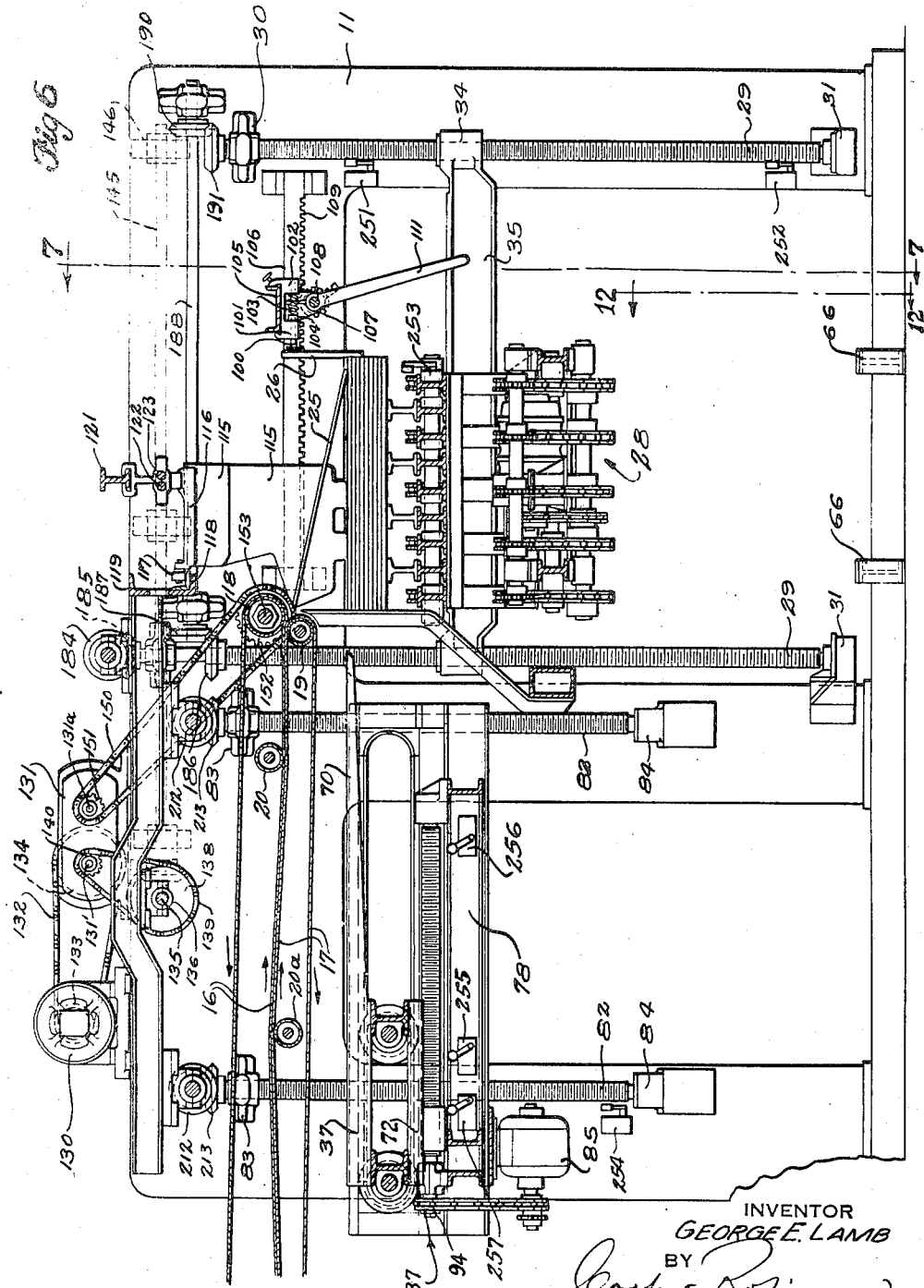

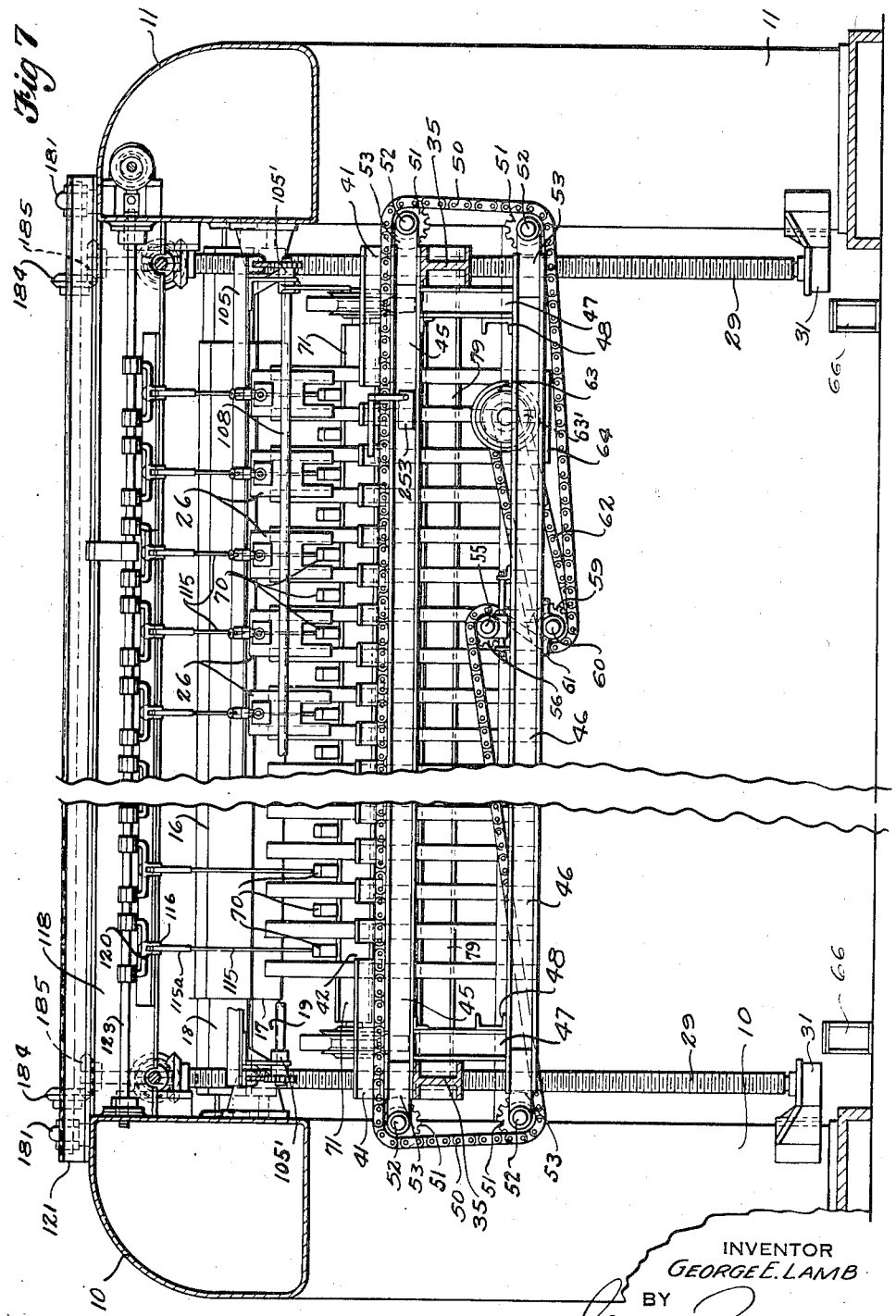

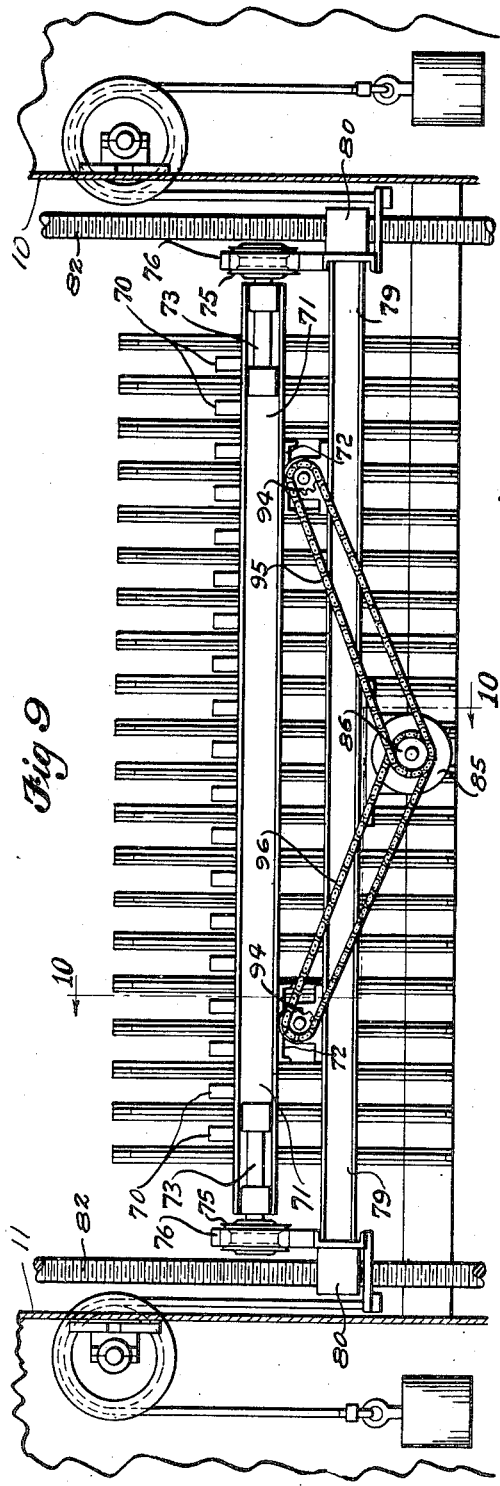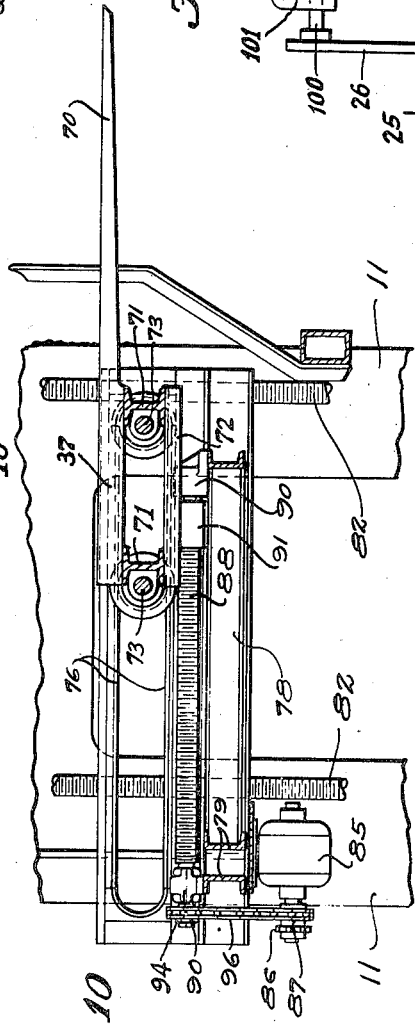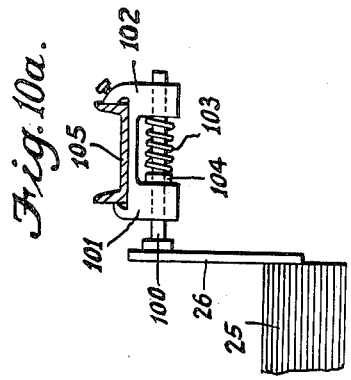

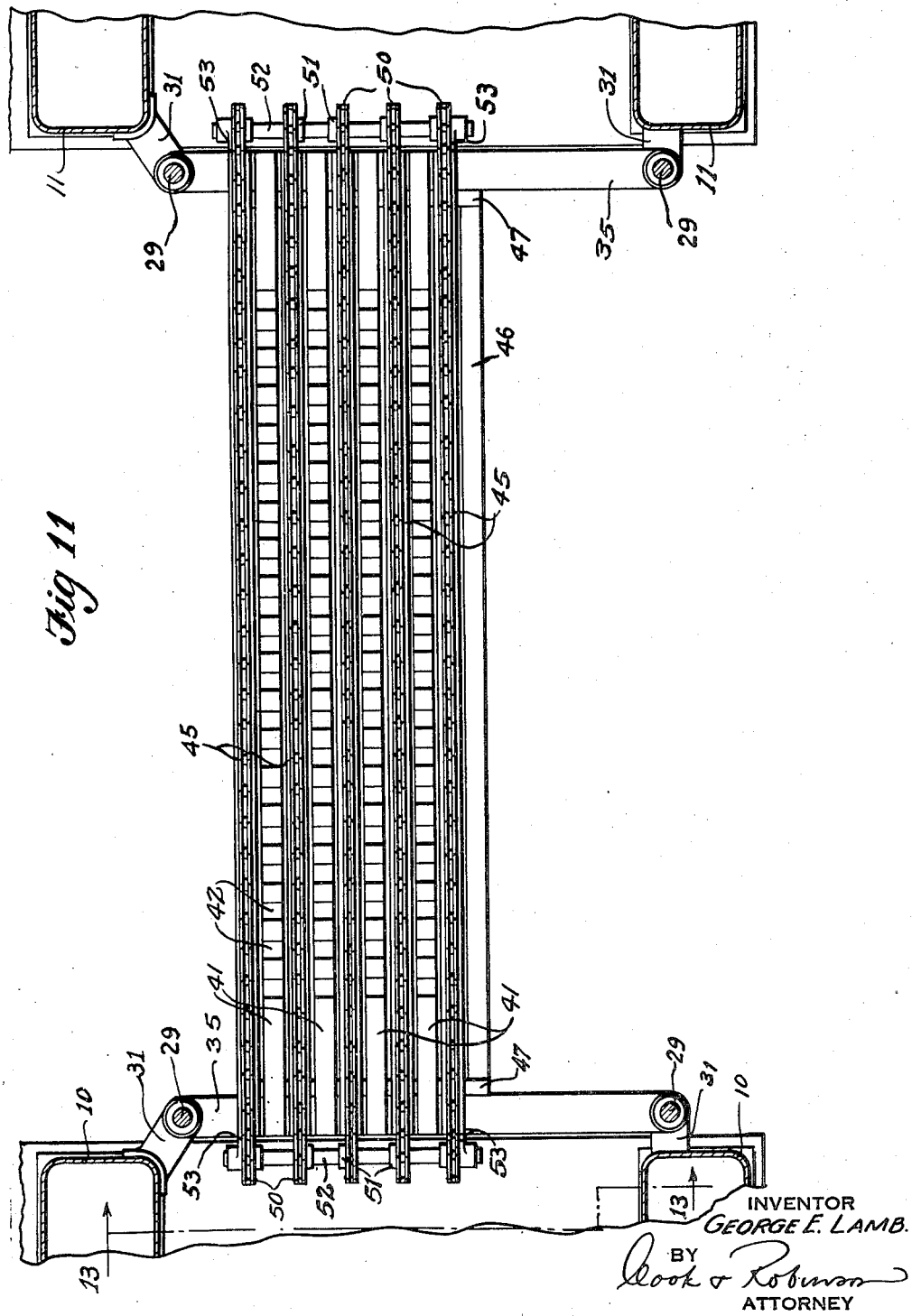

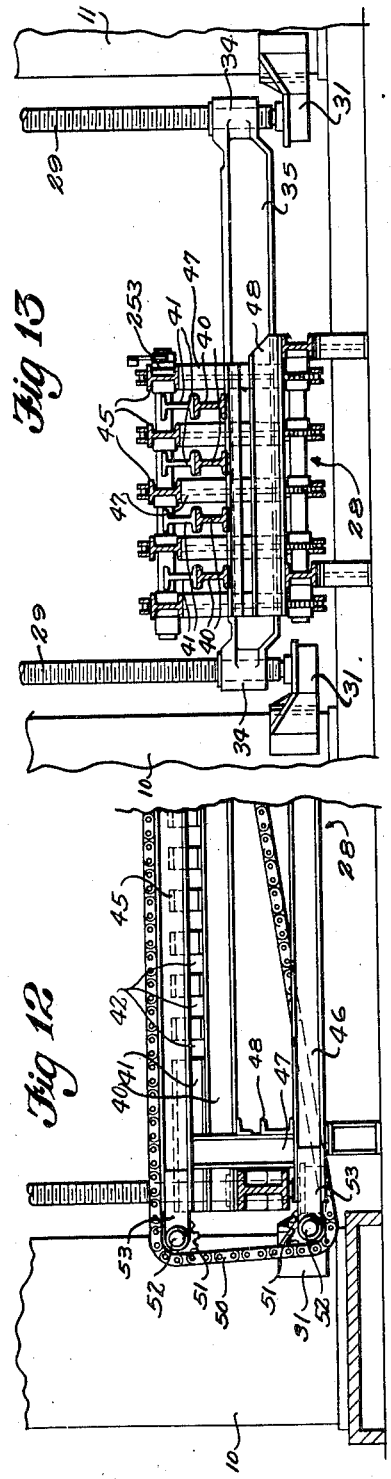

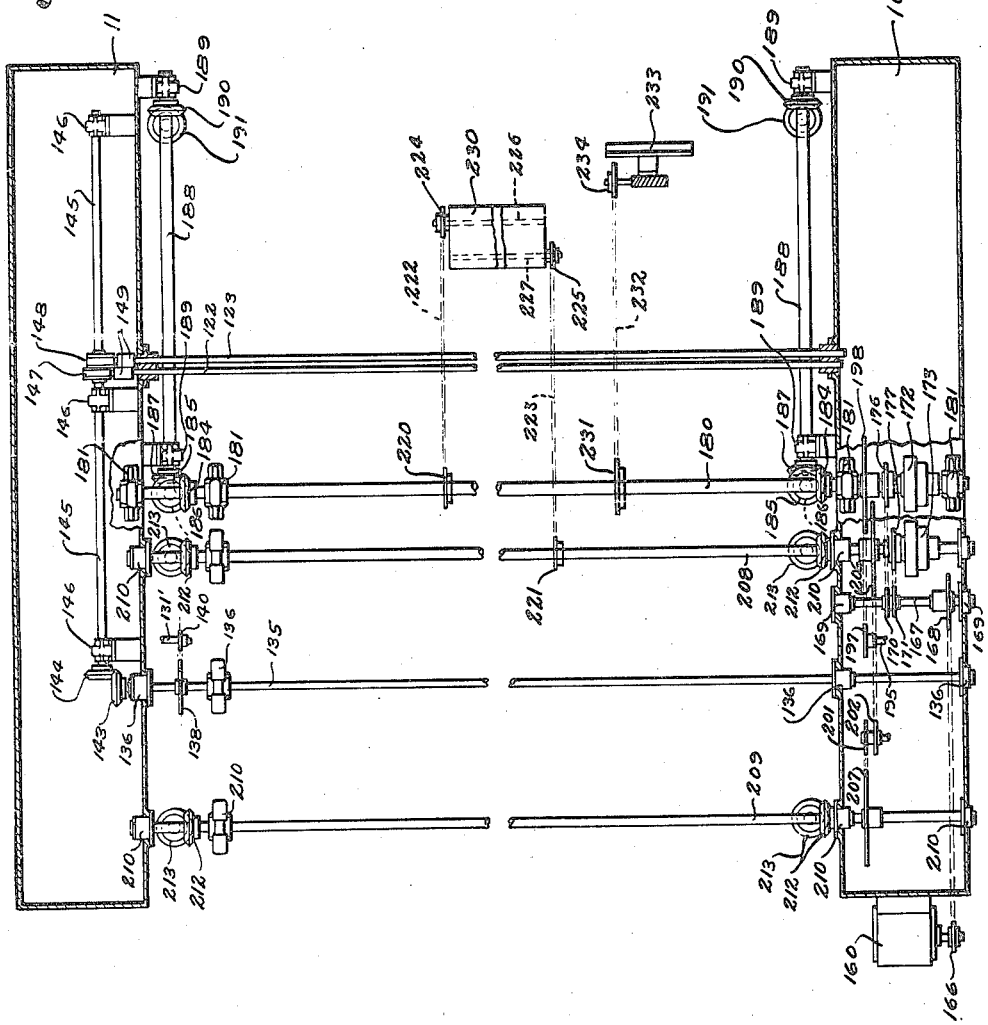

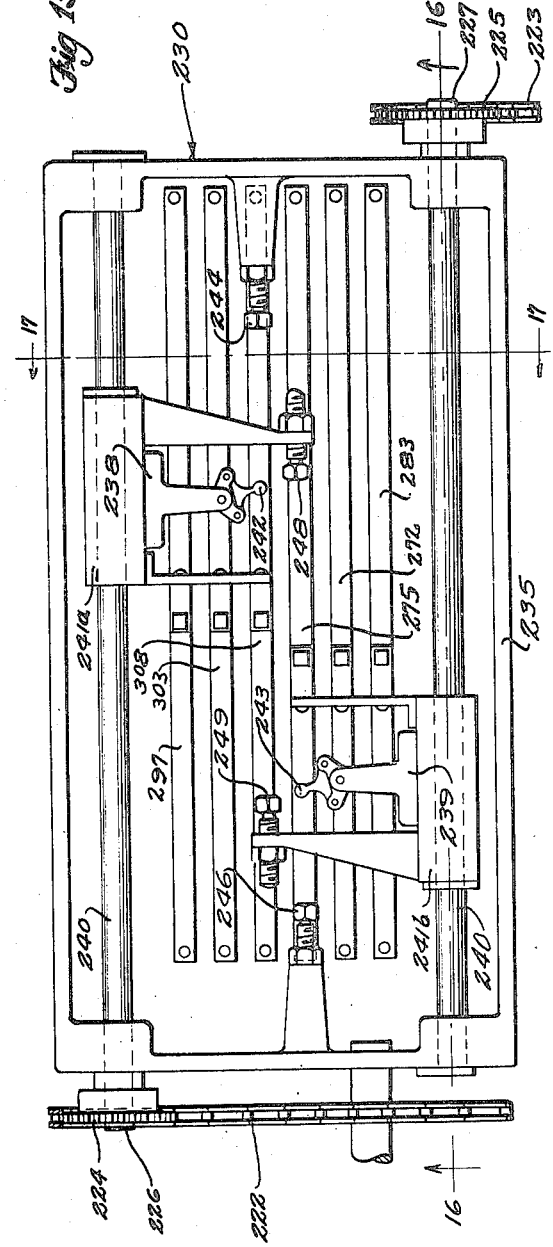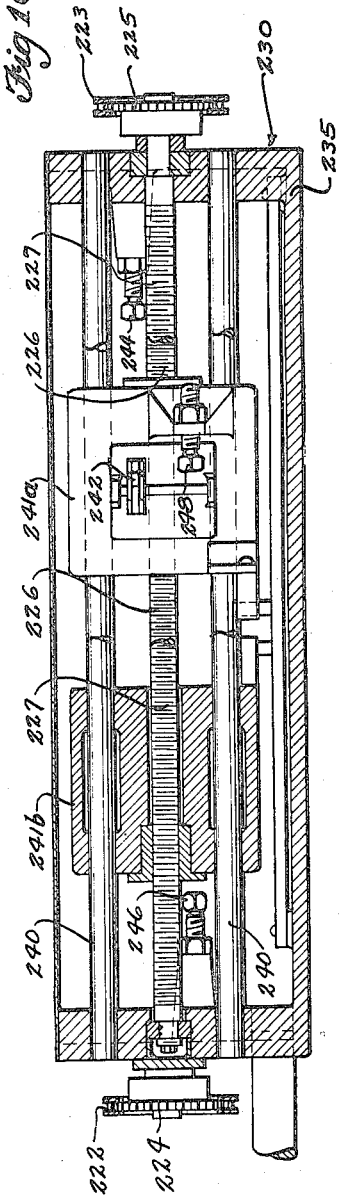

June 25, 1940.   G. E. LAMB   2,205,767
CONTINUOUS LAYBOY
Filed July 5, 1938   13 Sheets-Sheet 11
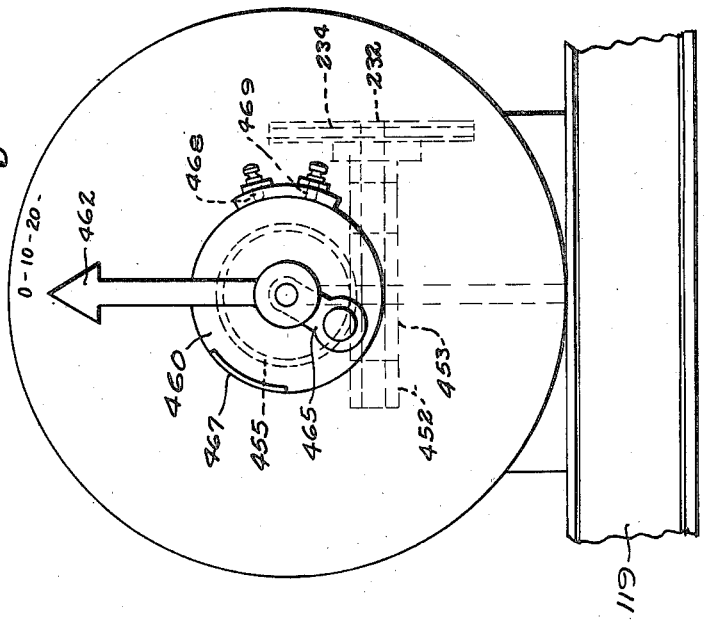
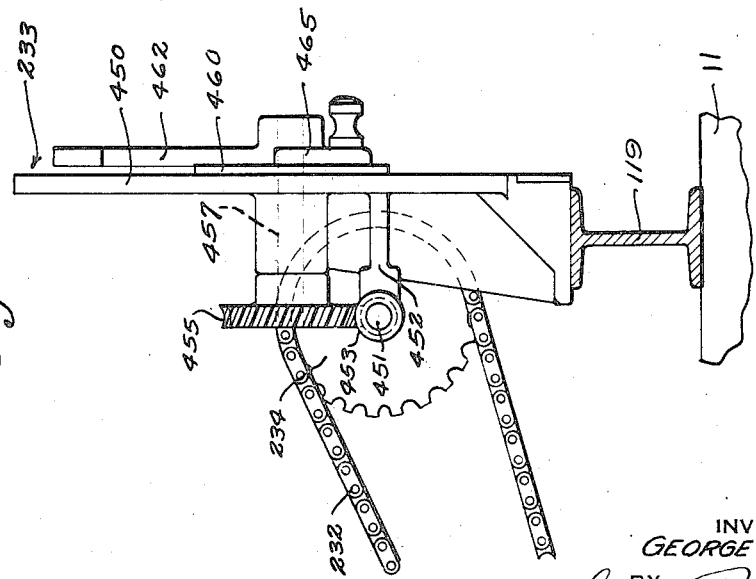
INVENTOR
*GEORGE E. LAMB*
BY
*Cook r Robinson*
ATTORNEY June 25, 1940.    G. E. LAMB    2,205,767
CONTINUOUS LAYBOY
Filed July 5, 1938    13 Sheets-Sheet 12
Fig 20
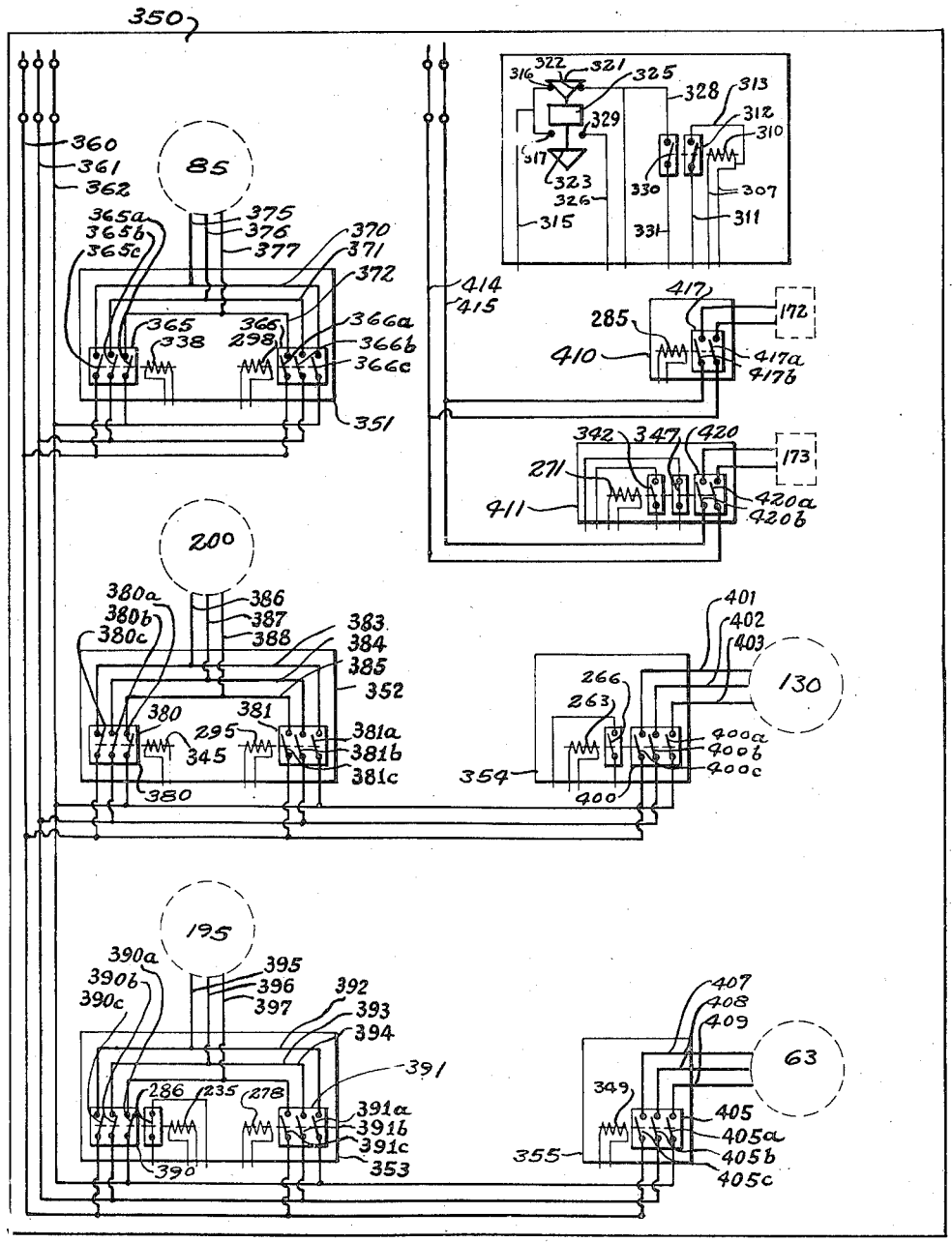
INVENTOR
GEORGE E. LAMB
BY
ATTORNEY

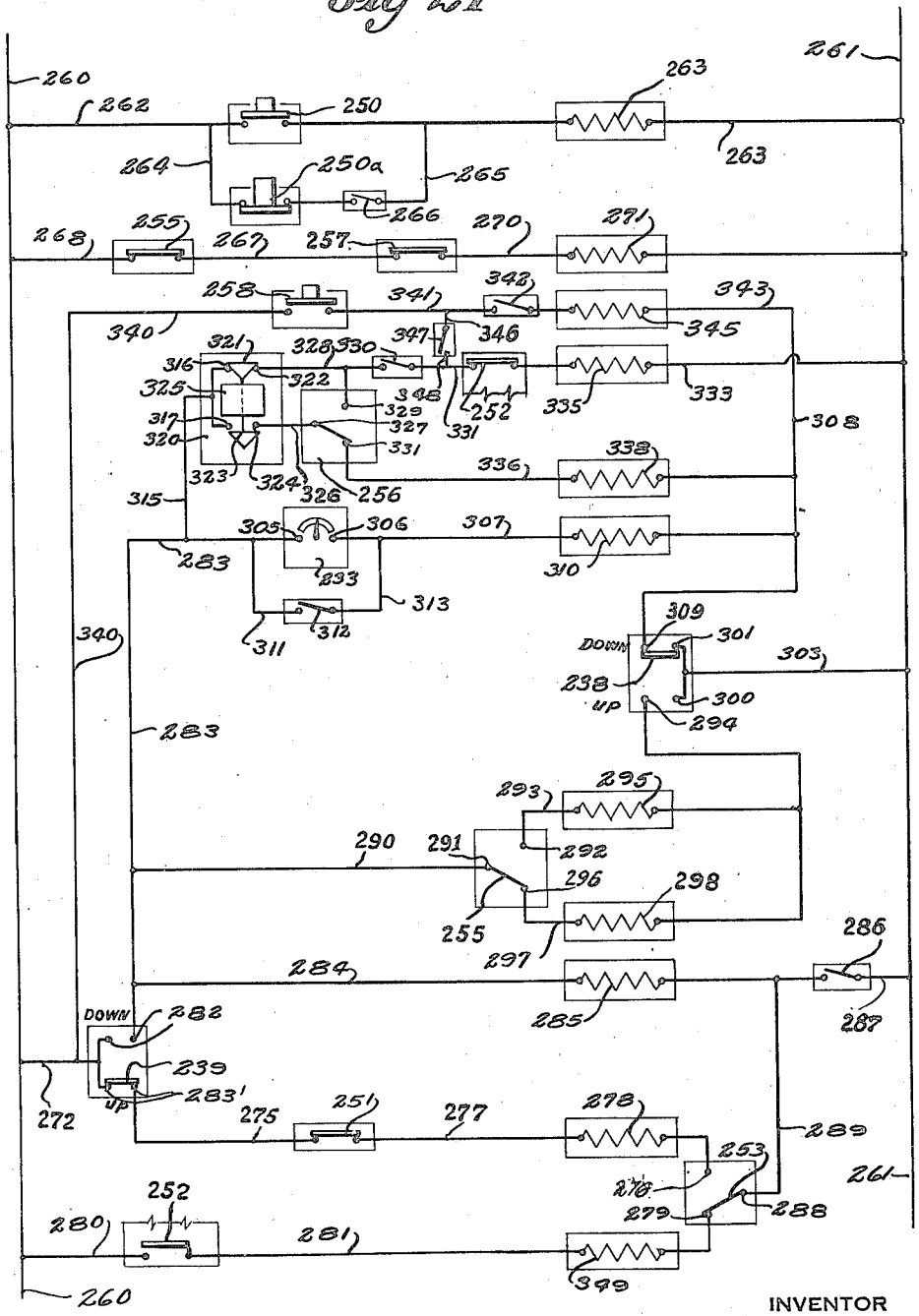

Patented June 25, 1940

2,205,767

UNITED STATES PATENT OFFICE 2,205,767

CONTINUOUS LAYBOY

George E. Lamb, Hoquiam, Wash.

Application July 5, 1938, Serial No. 217,463

7 Claims. (Cl. 271—38)

This invention relates to improvements in layboys as used in pulp and paper mills for the stacking of sheets of pulp or paper as they are discharged from the trimming and cutting machines; the invention having reference more particularly to continuous layboys and to a novel arrangement of supports or fingers arranged therein, which are automatically movable during an uninterrupted delivery of sheets from the machine, from a retracted position to an extended position, at which latter position they will serve in lieu of the main table, to receive and support the oncoming sheets during stack formation, for an interval of time during which a finished stack may be removed from the main receiving table of the machine, and the latter then brought back to receiving position.

Explanatory to the invention, it will here be stated that layboys, as now generally used, comprise a main receiving table onto which the sheets of pulp, or paper, as continuously delivered, are received in rapid succession to build up a stack. This receiving table is controlled by mechanism which causes it to move downwardly in accordance with the building up of the stack thereon, so that the top of the stack will remain substantially at the same level at all times. Also, some present-day machines are equipped with catch fingers which are adapted to be temporarily brought into position for catching the sheets of pulp that are delivered while the table carrying a finished stack is lowered, the stack removed from the table, and the table then returned again to receiving position; it being understood that as soon as the table is returned to receiving position, the catch fingers, or temporary supports, are retracted and the paper, as stacked thereon, is deposited on the table to form the lower portion of the next stack that is to be built up.

The objectionable feature of such layboys, as generally used, resides in the fact that the catch fingers, or temporary supports, provide for receiving only a limited number of sheets and this makes it imperative that the main table be lowered, the finished stack removed and the table returned to receiving position before that limited number of sheets has been delivered. Otherwise the stacking of sheets is disrupted.

In view of the undesirable result as above mentioned, and for other reasons, it has been the principal object of the present invention to provide a continuous layboy including the temporary fingers, but also including means whereby the supporting frame carrying the fingers is caused to travel downwardly in accordance with the rate of building up of a stack thereon, thereby making possible the reception of a far greater number of sheets thereon and providing also a longer period of time for the lowering of the main table, the removal of a stack therefrom and the return of the table to receiving position.

It is also an object of the present invention to provide means for quickly returning the main receiving table upwardly from unloading position to an elevation at which it will lift the partial stack, built up during unloading of the main table, and then automatically reverse its travel in accordance with the rate of building up of the stack by the delivery of sheets from the cutter, then effect a quick withdrawal of the fingers or temporary carrier and the return upwardly thereof to a neutral or retracted position until such time as again needed.

Still further objects of the invention reside in the provision of means for controlling the actuation or operation of the moving parts so that the action of the finger carrying frame, the main table, and the stack conveyor mechanism will all operate in a predetermined sequence and under automatic control.

Still further objects of the invention reside in the details of construction, in the combination of parts, and in their mode of operation, as will hereinafter be fully described.

In accomplishing these, and other objects of the invention, I have provided the improved details of construction, the preferred forms of which are illustrated in the accompanying drawings, wherein—

Fig. 2 is a view diagrammatically illustrating the relative positions of the main receiving table and unloading mechanism and the finger table, while a stack is being assembled on the table.

Fig. 3 is a similar view, showing the stack completed and the finger table moved forwardly to a position for receiving the sheets of pulp thereon in stack formation while the main table is being lowered and the finished stack removed therefrom.

Fig. 4 is a view diagrammatically illustrating the downward travel of the finger table in accordance with the building up of a stack thereon during the unloading of the main table.

Fig. 5 illustrates the return of the main receiving table after a stack has been removed therefrom, to a position for lifting the partially formed stack from the fingers of the finger table.

Fig. 6 is a central, vertical section taken longitudinally of the layboy, showing the finger table retracted and the main table in receiving position.

Fig. 7 is a vertical cross section, as seen on the line 7—7 in Fig. 6; certain parts being removed for better illustration.

Fig. 8 is a plan view of the finger table assembly and various parts associated therewith.

Fig. 9 is a rear end view of the finger table assembly particularly illustrating the extending and retracting mechanism for the table.

Fig. 10 is a sectional detail of parts of the finger table as seen on the line 10—10 in Fig. 9.

Fig. 10a is an enlarged detail of the stop adjusting means.

Fig. 11 is a plan view of the main receiving table.

Fig. 12 is a partial cross section as seen on the line 12—12 in Fig. 6, particularly illustrating the transfer belts in lifted position for operation.

Fig. 13 is a cross section on the line 13—13 in Fig. 11, also illustrating the transfer belts lifted for operation.

Fig. 14 is a shafting layout, in plan view, showing the various shafts and their gear and sprocket chain connection for driving them.

Fig. 15 is a plan view of the table control switch mechanism for the control circuit.

Fig. 16 is a vertical sectional view of the same on line 16—16 in Fig. 15.

Fig. 17 is a vertical section of the same on line 17—17 in Fig. 15.

Figs. 18 and 19 are details of the stack height control.

Fig. 20 is a wiring diagram of the control circuit.

Fig. 21 is a wiring diagram of the power circuit as operated by the control circuit.

Figure 1:
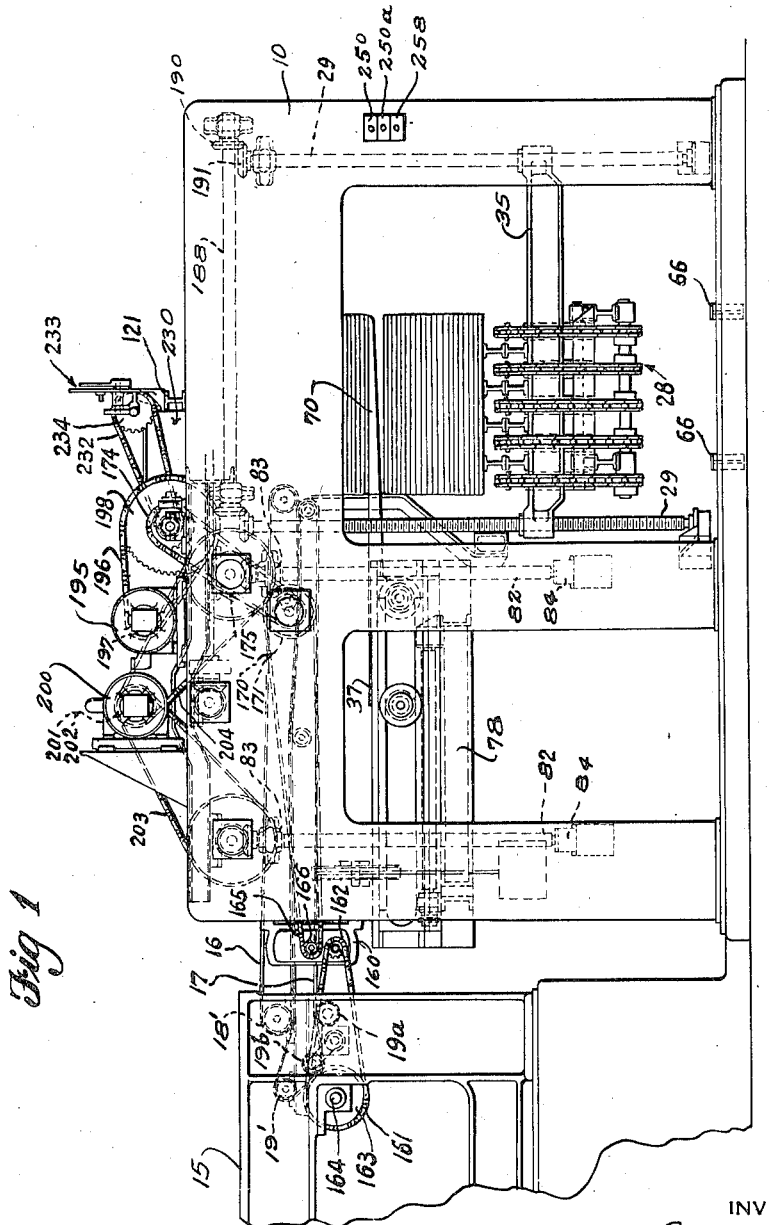
Fig. 1 is a side elevation of a continuous layboy embodying the present invention, showing the main receiving table loaded and ready to start downwardly for unloading, and showing the temporary fingers extended to receiving position and receiving the stack during the unloading period.

The pulp trimming machine, which cuts the continuous pulp strip into sections or sheets, is not shown completely in the accompanying drawings, as it is not thought essential to a clear understanding of the operation of the present layboy which, it is to be understood, is applicable to various types of pulp trimmers, slitters and cutters without any material change.

It will also be stated that while the present layboy is applicable to the stacking of sheets of pulp, cardboard, paper and the like, in the following description it will be described in connection with the stacking of sheets of pulp, but with the understanding that the description relates equally to the other uses.

The pulp, as it comes to the trimming machine, is in the form of a continuous strip, usually eight, ten or more feet in width, and in the trimmer, is trimmed along the edges, slit lengthwise into a plurality of strips of predetermined width, and is then cut transversely to produce the rectangular pieces of standard size.

The present continuous layboy provides means for receiving these cut pieces from the trimming machine, and for delivering them successively upon the main receiving table, which is caused to be gradually lowered as the stack is built up thereon, and subsequently transferring the stack from the layboy when it is of a predetermined height. This layboy also includes means for receiving the pieces of pulp during the unloading operation, on an extendable and retractable finger table, which is also lowered as the stack is built up, while the main receiving table is transferring the completed stack. Means are also included to maintain the stacks in even alinement as they are built up, and completely automatic and continuous operation of the machine.

Referring more in detail to the drawings—

The present layboy comprises the opposite side frames 10 and 11 of heavy and substantial formation, spaced somewhat apart and suitably mounted on the floor in a base and joined together by suitable members as will hereinafter be described. These frame members 10 and 11 are preferably formed of structural and sheet iron, and are so formed as to house various gears, sprockets and chains, and to mount various shafts, as will be explained.

As seen in Fig. 1, a portion of a trimming machine is indicated, as at 15, and 16 and 17 designate a pair of endless conveyor belts, better illustrated in Fig. 6, which are propelled in the direction of the arrows placed adjacent thereto. These belts travel in the same direction and at the same speed, and the lower run of the belt 16 and the upper run of the belt 17 run in contact with each other for the advancement of sheets of pulp between them for stacking. The belt 16 is driven by a roller 18 in the layboy, and passes over a supporting roller 18' in the cutter, while the belt 17 passes over rollers 19 and 19' in the layboy and cutter respectively, and has directional guide rollers 19a and 19b as shown in Fig. 1. It will be noted that there are also guide rollers 20 and 20a in the layboy that serve to guide the belts 16 and 17 in their travel and change their direction slightly so that they grip the sheets of pulp therebetween more firmly and insure proper delivery thereof.

In Fig. 6, 25 designates the sheets of pulp being delivered to a stack by the belts 16 and 17, and it is to be understood that the sheets are all of the same size and follow, one after the other in rapid succession, and are delivered from between these belts against vertical stops 26 which cause the sheets to fall into stacked formation. It is also understood that the sheets of pulp are of a degree of rigidity or stiffness that prevents them from buckling up and causes them to fall readily onto the stack.

Since the sheet delivery belts 16 and 17 have fixed or permanent positions in the machine, and since it is not desired that the sheets shall fall any appreciable distance to the top of the stack, it is the general practice in layboys to elevate the receiving table at the start of a stacking operation, up to receiving position, then to cause a gradual lowering thereof in accordance with the rate at which the stack is built up. This is the case in the use of the present machine, as is illustrated best in Figs. 1 and 6, wherein 28 designates, in its entirety, what is termed the main receiving table. This comprises a rectangular frame structure supported at its four corners by vertical screw shafts 29. Each shaft is revolubly mounted at upper and lower ends respectively in bearings 30 and 31, and the several shafts pass through threaded bearings 34 of lifting bars 35 of the main receiving table. Driving means, as presently described, is provided for rotating the four shafts in unison for the purpose of raising or lowering the frame, and this, insofar as lowering is concerned, is controlled by the feeding of sheets of pulp onto the stack.

In order to impart a better understanding of the mode of operation of the present layboy, it will here be explained that at the beginning of a stacking operation, the main receiving table 28 is elevated to its upper limit. Then, as the stack of pulp is built up thereon by delivery of sheets successively from the belts 16 and 17, the table is moved downwardly, under control of means presently described, at such rate that the top of the stack remains substantially at the same level. After the stack has reached a certain predetermined height, a finger table, designated in its entirety by numeral 37, is extended into a position so that its fingers extend horizontally across the top of the stack in position to catch the sheets of pulp thereon as delivered from the belts for an interval of time during which the main table is lowered, the stack removed therefrom, and the table raised back to position to lift the partial stack from the fingers and permit the finger table to be retracted and then moved up to normal or starting position.

In this operation, the finger table, like the main table, moves downwardly as a stack is built up thereon and when the main table is returned after being unloaded, to position to receive the partial stack from the fingers, certain means is provided for automatically stopping it in its upward travel and then to reverse it as soon as the partial stack has been deposited thereon.

In more specifically describing the construction of the main table 28 and stack transfer mechanism associated therewith, reference is directed to Figs. 1, 6, 7, 11, 12 and 13. The table, as shown in cross sectional detail in Figs. 6 and 13, embodies two frame structures, one of which is referred to as the main receiving table, and the other of which is referred to as the transfer table.

The receiving table comprises the two lifting bars 35 across its opposite ends, to which are fixed a plurality of longitudinal I-beams 40 in a transverse direction with reference to the delivery of pulp. Disposed longitudinally of and upon these beams 40 are other beams 41 which serve to support the sections of the stack of pulp as it is delivered from the belts. It should be noticed that these beams 41 are provided with cut-outs or recesses 42 at regular intervals, as seen in Figs. 7 and 12, which are adapted to receive the fingers of the finger table therein to allow the lifting of the partial stack from the finger table to the main receiving table, as will be understood when subsequently described.

The transfer table comprises a plurality of longitudinal I-beams 45, which rest at opposite ends on the lifting bars 35, and are joined to two lower I-beams 46 by spacers 47. It will be noted that there are cross members 48 fixed to the longitudinal beams 46, and the spacers 47 are fixed to these cross members.

Endless chain belt conveyors 50 encircle the transfer table as noted in Fig. 7, and the top runs of these belts overlie the beams 45 lengthwise thereof, which beams serve as tracks. These belts are carried by sprocket wheels 51, which are mounted on cross shafts 52, which, in turn, are mounted transversely of the table on the ends of the beams 45 and 46 in bearing 53.

A slack take-up means for the conveyor chains is provided in the medium of cross shafts 55 and 60 which are mounted on the beams in vertically spaced relationship, and provided with sprockets 56 and 59 respectively about which the chains pass. The shaft 60 is mounted in fixed bearings 61, and shaft 55 is mounted in movable bearings and may be shifted lengthwise of the frame to maintain a desired tension on the chains. The shaft 60 also is the driving shaft for the conveyor chain belt and is driven by a chain belt connection 62 with the driven sprocket 63' of an electric motor 63 which is mounted on a base plate 64 fixed to the beams 46.

Four resting or supporting blocks 66 are so located on the floor beneath the main receiving table as to contact and support the transfer table 10 as the main receiving table is lowered, to hold the transfer table at a predetermined level while the receiving table lowers somewhat farther. This transfers the stacks of pulp from the beams 41 to the conveyor belts 50, and when the motor 63 is started, the stacks of pulp are transferred by the belts 50 to a conveyor system, not shown, to move them to desired points for baling, storage or shipment.

The finger table 37 comprises a horizontal bed formed by a plurality of parallel, spaced fingers 70 with corresponding ends fixed rigidly to longitudinal supporting beams 71, which are joined together by opposite end connecting channel beams 72. At opposite ends of the beams 71, spindle shafts 73 are fixed by bearings 74 and on the spindles are mounted wheels 75 for travel in guideways 76 which are fixed in, or formed as a part of, a carrier frame structure 78 which is supported for vertical travel and thereby serves as a means for raising and lowering the finger table.

As will be observed by reference to Fig. 8, the frame structure 78 is of rectangular form and at its opposite ends has bearings 80 fixed thereto and through which vertical supporting shafts 82 are threaded. These shafts are at what may be considered the four corners of the frame 78 and are revolubly mounted at their upper and lower ends respectively in bearings 83 and 84 and are adapted to be rotated in unison to lower the finger table in accordance with the building up of the stack on the fingers when they are extended, and the stack is being built up thereon.

First describing the means for extending and retracting the finger table; reference being had to Figs. 6 to 10 inclusive: An electric motor 85 is operatively supported centrally from the under side of the longitudinal beams 79 of frame 78, and mounted on the motor shaft are two belt pulleys 86 and 87. Mounted in the frame, near its opposite ends, are transverse screw shafts 88 and 89; these shafts being revoluble in bearings 90 fixed on the frame, and also being threaded through nuts 91 fixed to and depending from the carriage 37. At their rear ends, the shafts 88 and 89 are equipped with belt wheels 94—94 that are alined respectively with the belt wheels 86 and 87, and belts 95 and 96 are extended about the alined wheels to provide means whereby the motor may drive the screw shafts to effect the moving of the carriage between retracted and extended positions; the direction of travel being dependent upon direction of rotation of the motor shaft. In retracted position, the fingers are out of the area above the main receiving table, and when extended they extend into this area.

As the sheets, or pieces, of pulp are delivered from between the driven belts 16 and 17, they are projected so that their forward edges engage against the vertical stops 26. These stops comprise flat, vertically disposed plates, each mounted on a short supporting shaft 100 that is slidable within supporting bearings 101 and 102, as seen in Fig. 6, and by reference to Fig. 7, it will be observed that the bearings for the various stop bars are carried by and adjustable on a supporting beam 105 which is slidably mounted at its ends for adjustment from and toward the stack, on supporting bars 106 fixed to the side frames 10 and 11. The adjustment of the beam is effected by means of pinion gears 107 that are fixed on the ends of a cross shaft 108 which is revolubly carried below the beam 105 by bearings 105'. The gears mesh respectively with rack surfaces 109 on the under edges of the bars 106 and a lever 111 is fixed to the shaft to rotate it as necessary to make an adjustment of the beam and thus move all stops toward or from the stack. A spring 103 encircles each of the shafts 100 between its supporting bearing 102 and a collar 104 that is fixed on the shaft 100, so that the stop 26 may be somewhat yieldable to the sheets or pieces of pulp as they impinge thereon, and will operate to bring the sheets into alinement as they come to rest on the stack.

It is desirable also, as the various sections of a stack are built up by the successive and simultaneous delivery of the cut sheets thereonto, that these sections be spaced apart and that the edges of the sections be evenly formed. Therefore, it will be observed, by reference to Figs. 6 and 7, that between the sections are spacers 115 in the form of thin, vertical plates, disposed longitudinally of the direction of travel of the sheets or pieces of pulp, whereby to insure separation of the sections and to aline the edges of the sheets as they are delivered from the belts 16 and 17, onto their respective sections of the stack.

These spacing plates each are strengthened and stiffened by a heavier portion 115a which is secured thereto along its top edge, and which, in turn, is formed with a backing strip 116. The backing strip 116 is provided at one end with a supporting roller 117 which is adapted for travel along the base flange of a channel iron beam 118, which, as noted in Fig. 6, is fixed to a cross beam 119 in the main frame. The outer end of the backing 116 of each spacer is fixed to a supporting bracket 120. The brackets, in turn, are supported by cross shafts 122 and 123, which are in close parallel relation and are reciprocally activated in unison but in opposite directions. The brackets are successively fixed to different shafts, and alternately to the same shaft. Thus, as one moves a short distance in one direction, the other operates in the opposite direction and with every other spacer attached to opposite cross shafts, such motion will be transmitted to the spacers so that the side edges of the sections of the stack will be kept true and even.

Referring again to Fig. 6, it will be seen that an electric motor 130 and a variable speed transmission mechanism, indicated at 131, are mounted on the side frame structure 11. The motor drives the transmission mechanism through the mediacy of a sprocket chain belt 132 that operates about a sprocket 133 on the shaft of the motor and a sprocket 134 on the driving shaft 131' of the transmission mechanism. It is also observed that there is a cross shaft 135 mounted in bearings 136, fixed to the framework of the layboy and this is driven by a connection with the transmission mechanism comprising a sprocket chain belt 139 that operates about sprocket wheels 138 and 140 fixed respectively on the shaft 135 and on the drive shaft 131' of the transmission mechanism.

The driven cross shaft 135 is equipped at one end with a bevel gear 143, and this operates in mesh with a bevel gear 144 on a shaft 145 to drive the shaft.

Shaft 145 extends along the frame 11 and is revolubly supported in bearings 146, and it has two eccentrics 147 and 148 mounted thereon through the mediacy of which the spacer cross shafts 122 and 123 are reciprocally actuated; the operating connection comprising links 149 which have ends fitted about the eccentrics and pivotally attached to the ends of the shafts.

It will here be mentioned that the belts 16 and 17 are driven, as previously mentioned, by a connection with the transmission mechanism; the connection comprising a chain belt 150 that operates about a sprocket wheel 151 fixed on a drive shaft 131a extending from the transmission mechanism, and about a sprocket 152 fixed on shaft 153.

The raising and lowering of the finger table 78 by the vertical, threaded shafts 82 and the raising and lowering of the main receiving table 28 by the threaded shafts 29, is effected as follows: A variable speed transmission mechanism 160 is mounted on the vertical end surface of frame member 10, as noted in Figs. 1 and 14, and is driven by a chain belt 161 operating about a sprocket wheel 162 fixed on the driving shaft of the transmission mechanism and about a sprocket wheel 163 which is fixed on a driven cross shaft 164 in the cutter 15. Mounted in the hollow frame member 10, to rotate in supporting bearings 169, is a short cross shaft 167, and this is driven by the transmission mechanism by means of a chain belt 165 which operates about a sprocket wheel 166 on a driven shaft extending from the transmission mechanism, and about a sprocket wheel 168 on shaft 167. Also mounted on the shaft 167 are two sprocket wheels 170 and 171 which have driving connection with magnetic clutches 172 and 173 respectively through the mediacy of chain belts 174 and 175 which are disposed about sprocket wheels 176 and 177 on the magnetic clutches.

The magnetic clutch 172 is mounted on a cross shaft 180 rotatably carried in suitable bearings 181 in the frame members 10 and 11; the shaft 180 having bevel gears 184 fixed thereon at opposite sides of the machine which are in driving mesh respectively with bevel gears 185 fixed on two of the vertical shafts 29, which, as was previously stated, are provided for the vertical adjustment of the main receiving table 28; the two shafts 29 that are thus driven by the cross shaft 180 being those closest to the cutter.

Mounted on the two shafts 29, which are thus driven directly by the cross shaft 180, at distances somewhat spaced below the bevel gears 185 are bevel gears 186, and these are in operation or driving mesh with bevel gears 187 which are fixed on shafts 188, which are carried in suitable bearings 189 on the frame members 10 and 11, and extend along the frame members, as noted in Fig. 14. Bevel gears 190, mounted on the shafts 188, are in driving mesh with bevel gears 191 on the two vertical, threaded shafts 29 at the outside of the main receiving table. By such an arrangement, all four of the vertical, threaded shafts are adapted to be rotated in the same direction and at the same speed simultaneously to raise or to lower the main receiving table.

A further driving connection for the main receiving table 28 is provided for reasons presently explained, and this connection comprises an electric motor 195 mounted on the frame member 10, and connected with shaft 180 through a chain belt 196 that is disposed about a sprocket wheel 197 on the motor shaft and a sprocket wheel 198 fixed on the shaft 180.

An electric motor 200 is mounted on the frame member 10 and has its drive shaft provided with sprocket wheels 201 and 202, about which are disposed chain belts 203 and 204, which extend about sprocket wheels 206 and 207 on cross shafts 208 and 209 respectively; the cross shafts 208 and 209 being extended horizontally between the frames 10 and 11 and are supported in suitable bearings 210 in the frames, as will be noted in Fig. 14. These shafts have bevel gear wheels 212 fixed thereon, which gears are in driving mesh with bevel gears 213 on the upper ends of the vertical, threaded shafts 82.

By such driving connection, as heretofore described, it is provided that either the finger table 78, or the main receiving table may be adjusted by either drive connection, i. e., for the finger table, through the motor 200 with chain belts 203 and 204 about the sprockets 201 and 202 to the sprockets 206 and 207, or from the transmission mechanism 160 to the short cross shaft 167 to the shaft 208 through the chain belt 175, on the sprockets 171 and 177 on the short cross shaft and magnetic clutch 173 respectively.

It is to be understood that by so rotating the shaft 208, the shaft 209 will also be rotated at the same time and in the same direction and speed through the chain belts 203 and 204 about the sprockets 206 and 202, and 201 and 207; the motor 200 idling as the cross shafts 208 and 209 are rotated.

The drive connections for the main receiving table are from the motor 195 through the chain belt 196 about the sprockets 197 on the motor and 198 on the shaft 180, or through the transmission 160 to the short cross shaft, as explained for the finger table, thence by a chain belt 174 from the sprocket 170 on the short cross shaft to the sprocket 176 on the magnetic clutch 172 on the shaft 180.

Mounted on the cross shaft 180 and also on the cross shaft 208 are sprockets 220 and 221, about which are the chain belts 222 and 223 which overlie sprockets 224 and 225, respectively, which are mounted upon the shafts 226 and 227 of the table control switch mechanism 230.

Also mounted on the cross shaft 180 is the sprocket 231 about which overlies a chain belt 232, which operates the stack height control 233 through the sprocket 234.

The stack height control mechanism, as illustrated in Figs. 18 and 19, comprises a circular dial 450 which is supported upon a cross member 119. A shaft 451 is supported by a bracket 452 on the rearward side of the dial 450 and mounts thereon a sprocket wheel 234 about which a chain belt 232 travels. A worm gear 453, mounted on the shaft 451, is in driving mesh with a pinion gear 455 which is mounted on a shaft 457 which is located centrally of the circular dial 450. Rotatably mounted upon this shaft 457 on the face of the dial 450 is a smaller disk 460. An indicator 462 is mounted on the outer end of the shaft 450 and serves to retain the disk 460 in place. An arm 465 is adapted to engage the disk 460 and is fixed to the indicator 462. A metal plate 467 is fitted upon the periphery of the disk 460 so as to contact the points 468 and 469, when rotated to the proper position.

The operation of the stack height control is as follows: As the shaft 180 is rotated, sprocket 231 will drive the chain belt 232, which, in turn, will drive the sprocket 234 so as to rotate the shaft 451. The worm gear 453 will drive the pinion gear 455 and rotate the shaft 457. The indicator 462 will be moved by the shaft 457 and the disk 460 will be caused to revolve with the indicator 462. The metal plate 467, upon contacting the points 468 and 469, will close the electrical circuit.

The table control switch is illustrated in Figs. 15, 16 and 17, in enlarged detail, and, as seen in Fig. 1, is mounted on the cross members 119 and 121, and as seen in Fig. 6, is approximately centrally located on the machine. The table control switch comprises a housing 235 of rectangular shape, within which the shafts 226 and 227 are mounted for rotation at forward and rearward sides thereof respectively, with the sprockets 224 and 225 fixed thereon and the chain belts 222 and 223 overlying these sprockets respectively. It will be noted that the shafts 226 and 227 are threaded so as to carry the finger table limit switch 238 and the table limit switch 239 respectively, in either direction, according to the direction of rotation of the shafts.

Guide shafts 240 are disposed parallel to and in the same vertical plane as the shafts 226 and 227, and the blocks 241a and 241b, which carry the switches 238 and 239, are mounted slidably thereon.

The toggle 242 of the finger table limit switch 238 is adapted to be thrown by the fixed stud 244 mounted in the end wall of the box 235, and the toggle 243 of the table limit switch 239 is adapted to be thrown by the fixed stud 246 mounted in the opposite end wall of the box 235 when they reach their outer limit. Also, the blocks 241a and 241b have studs 248 and 249, respectively, fixed thereon which are adapted to contact and throw the toggles 242 and 243 respectively, when they approach and contact each other in their inner limit of travel, for reasons to be explained with the wiring diagram and mode of operation. It will be noted that the toggle 242 of the finger table limit switch 238 is in the same line or plane as the studs 244 and 249, and also that the toggle 243 of the table limit switch 239 is in the same line or plane as the studs 246 and 248 slightly below the other plane.

As seen in Fig. 1, there are start and stop press buttons 250 and 250a respectively, the table control switch 230 and the stack height control 233, and as seen in Figs. 6 and 7, there are the table up limit switch 215, the table down limit switch 252, the pulp on chain switch 253, the finger table lower limit switch 254, the finger withdraw limit switch 255, the finger out limit switch 256, the finger clutch switch 257, and the jog press button 258, which will be dealt with in connection with the wiring diagrams in Fig. 20 and Fig. 21, as will now be described.

It will be here stated that there are three separate electrical circuits in use, namely 440 volts alternating current, 220 volts direct current and 110 volts alternating current; the 440 v. A. C. being the power circuit operating the large motors, the 110 v. A. C. being the control circuit that operates relay switches to control the power circuit, and the 220 v. D. C. being used to operate the magnetic clutches; this circuit also being operated by relay switches in the 110 v. A. C. control circuit.

Referring now to Fig. 21, the line 260 represents the hot or positive line of the 110 v. A. C. control circuit and the line 261 represents the return or negative line, and one side of the start press button, which is normally open, is connected to the hot line 260, and the other side is connected to the return line 261 by the lines 262 and 263 respectively, and within the line 262, a relay coil 263 is interposed. The stop press button 250a, which is normally closed, has one side connected to the line 262 by a line 264, and the other side connected to the line 263 by a line 265, and within the line 265 is an auxiliary switch 266 that is held closed when the relay coil 263 is once energized.

The finger table lower limit switch 255 has a line 268 connecting one side of it with the line 260, and the other side is connected to the finger clutch switch 257 by a line 267, the other side of which is connected to the return line 261 by a line 270, within which a relay coil 271 is interposed.

The table limit switch 239 is connected to the hot line 260 by a line 272, and this table limit switch is adapted to be closed either to an "up" position or to a "down" position, the up contacts 283' closing a circuit through the line 275 to the table up limit switch 251, the opposite side of which is connected to the contact 276 of the pulp on chain switch 253 by a line 277, within which is a relay coil 278.

From the line 260, a line 280 connects to one side of the table down limit switch 252, which is normally open, and the other side of this switch is connected by a line 281, to the contacts 279 of the pulp on chain switch, within which line 281 a relay coil 349 is interposed. A circuit is completed through the contacts 282 of the table limit switch 239 through the line 283 and through the line 284 to the auxiliary switch 286. The opposite side of this auxiliary switch 286 is connected to the line 261 by a line 287. Within the line 284, the relay coil 285 is interposed. From the contact 288 on the pulp on chain switch 253, a line 289 connects to the line 284 between the relay coil 285 and the auxiliary coil 286. From the line 283, a line 290 connects to the contact 291 of the finger withdrawal limit switch 255. From a contact 292 of the finger withdrawal limit switch 255, a line 293 connects to the contact 294 of the finger table limit switch 238 within which is interposed a relay coil 295. From the contact 296 of the finger withdrawal limit switch 255, a line 297 also connects to the contacts 294 of the finger table limit switch 238 within which a relay coil 298 is interposed. From the contacts 300 and 301 on the finger table limit switch 238, a line 303 connects to the line 261. It will here be stated that the finger table limit switch 238 may be closed to either an "up" position or a "down" position as is also the table limit switch 239. The line 283 connects to the contact 305 of the stack height control 233. The other contact 306 of the stack height control is connected by a line 307 to a line 308 which connects to the contact 309 of the finger table limit switch 238. Within a line 307, a relay coil 310 is interposed. A line 311, connected to the line 283, connects to an auxiliary switch 312, the opposite side of which is connected to the line 307 by a line 313. A line 315 connects to the contacts 316 and 317 of a time relay mechanism 320 with the line 283. This time relay mechanism 320 is a double switch arrangement whereby one circuit will be maintained for a definite period of time. Then this first circuit will be opened, and a second circuit will be closed. The switch 321 of the time relay mechanism 320 closes a circuit between the contacts 316 and 322, and is normally a closed switch. The switch 323 closes a circuit between the contacts 317 and 324, and this switch is normally an open switch. A mechanical escapement mechanism 325 is so adjustable as to operate the switch 321 to an open position, and the switch 323 to a closed position. A line 326 connects a contact 324 of the time relay switch 320 with the contact 327 of the finger out limit switch 256. A line 328 connects the contact 322 of the time relay switch 320 with the contact 329 of the finger out limit switch, and this line 328 also connects to one side of an auxiliary switch 330. The other side of the auxiliary switch 330 is connected to the table down limit switch 252 by a line 331. The other side of the table down limit switch 252 is connected to the line 261 by a line 333 within which a relay coil 335 is interposed. A line 336 connects the contact 331 of the finger out limit switch to the line 308 within which a relay coil 338 is interposed. From the line 272, a line 340 connects to the jog push button 258, the other side of which is connected by a line 341 to an auxiliary switch 342 of which the other side is connected to the line 308 by a line 343 within which a relay coil 345 is interposed. A line 346 is connected to the line 341 and to one side of an auxiliary switch 347, the other side of which is connected to the line 331 by a line 348.

Now referring to Fig. 20, which is the power circuit wiring diagram, the operation of the aforementioned relay coils in the control circuit will be explained:

A panel board 350 mounts thereon sub-panel boards 351, 352, 353, 354 and 355, switches upon which are connected to the 440 v. A. C. power lines 360, 361 and 362, which are of the usual three-line type. On the panel board 351 are mounted two three-pole switches, 365 and 366, which have the blades 365a, 365b and 365c and 366a, 366b and 366c, respectively, which connect to the lines 360, 361 and 362, respectively. These blades are adapted to be operated through the mediacy of the relay coils 338 and 298, which are of the solenoid type and operate the switches to either open or closed position. It will be noted that the wires 370, 371 and 372 are so connected to the contacts of these switches as to reverse the polarity of the current when one switch is open and the other closed. The lines 375, 376 and 377 connect to the lines 370, 371 and 372, and lead to the motor 385, which operates the fingers inwardly and outwardly. It is obvious from this connection that when the switch 365 is closed, the motor will run in one direction and when the switch 366 is open and the switch 365 closed, the polarity of the circuit being changed, the motor will run in the opposite direction.

Likewise, the panel board 352 mounts thereon two three-pole switches 380 and 381 which have the blades 380a, 380b and 380c, and 381a, 381b and 381c, which connect respectively with the wires 360, 361 and 362. These blades 380a, 380b and 380c, and 381a, 381b and 381c are adapted to be operated by the coils 345 and 295 which are of the solenoid type and operate the switches to either opened or closed position. It will be noted that the wires 383, 384 and 385 are so connected as to reverse the polarity of the circuit when one switch is open and the other closed. The lines 386, 387 and 388 connect to the lines 383, 384 and 385 and lead to the motor 200 which operates the finger table up or down. It is obvious when the switch 380 is closed, the motor will run in one direction, and when the switch 380 is open and the switch 381 closed, the polarity of the circuit being changed, the motor will run in the opposite direction.

On the panel board 353 are mounted the switches 390 and 391, which have the blades 390a, 390b and 390c, and 391a, 391b and 391c which connect respectively with the wires 360, 361 and 362. These blades are adapted to be operated by the coils 385 and 278 which are of the solenoid type and operate the switches to either open or closed position. It will be noted that the auxiliary switch 286 is also operated by this coil 285 and its operation will be to a closed position when the switch 390 is open and to an open position when the switch 390 is operated to a closed position. The wires 392, 393 and 394 are so connected to the contacts of these switches as to reverse the polarity of the circuit when one switch is open and the other closed. The lines 395, 396 and 397 connect to the lines 392, 393 and 394 and lead to the motor 195 which operates the main receiving table upwardly and downwardly. It is obvious when the switch 390 is closed, the motor will run in one direction, and when the switch 390 is open and the switch 391 closed, the motor will run in the opposite direction.

On the panel board 354 there is a three-pole switch 400 having the blades 400a, 400b and 400c which connect to the lines 360, 361 and 362. This switch is adapted to be operated to an open or closed position by the relay coil 263 which is of a solenoid type. Also, the auxiliary switch 266 is controlled by this relay coil 263. The operation of the auxiliary switch 266 will be the same as the switch 400; specifically, to a closed position when the switch 400 is closed, and to an open position when the switch 400 is open. The lines 401, 402 and 403 lead to the motor 130.

On the panel board 355 is a three-pole switch 405 having the three blades 405a, 405b and 405c which connect to the lines 360, 361 and 362. This switch is adapted to be operated to either an open or closed position by the relay coil 349 which is of the solenoid type. The wire 407, 408 and 409 lead to the motor 63.

Also on the panel board 350 are the sub-panel boards 410 and 411 which are connected to the lines 414 and 415, which are 220 v. D. C. On the panel board 410 is the double pole switch 417 having the blades 417a and 417b which connect to the lines 414 and 415. These blades are adapted to be operated to either a closed or open position by the relay coil 385 which is of the solenoid type. Lines 418 and 419 lead from the switch 417 to the table clutch 172. On the panel board 411 is the two-pole switch 420 having blades 420a and 420b which are connected to the lines 414 and 415 and are adapted to be operated to either closed or open position by the relay coil 271 which is of the solenoid type. Also, under the control of this relay coil 271 are the auxiliary switches 342 and 347. The switch 420 is in an open position, the auxiliary switch 342 is in an open position and the auxiliary switch 347 is in a closed position. When the switch 420 is in a closed position, the auxiliary switch 342 will be in a closed position and the auxiliary switch 347 will be in an open position.

Assuming the layboy to be so constructed, its mode of operation would be as follows:

For a better understanding of the operation of the layboy, the description of its operation will be taken up at the point where the fingers 70 are in extended position, and the main receiving table 28 has discharged a completed stack of pulp and is ready to be elevated. In this position, the switches are in the following positions: Starting switch 250 is open, stopping switch 250a is closed; finger table lower limit switch 254 is closed; finger clutch switch 257 is closed; relay coil 271 is energized, which closes the switch 420, and also closes the auxiliary switch 342 and opens the auxiliary switch 347. The table limit switch 239 is closed to the up position across the contacts 273. The switch 321 in the time relay mechanism is closed; the auxiliary switch 330 is open; table down limit switch 252 is closed, and the relay coil 235 is dead. The switch 323 is open; the finger out limit switch 256 is closed across the contacts 327 and 337; the relay coil 338 is dead, and the stack height control switch 233 is open. The auxiliary switch 312 is open, the relay coil 310 is dead, the finger table limit switch 238 is in a down position, or closed across the contacts 309 and 301. The finger withdrawal limit switch 255 is closed across the contacts 291 and 296, the relay coil 295 is dead, the relay coil 298 is dead, the relay coil 285 is dead by virtue of the table limit switch 239 being in the up position. The auxiliary switch 286 is closed by virtue of the relay coil 235 being dead. The table up limit switch 251 is open, the pulp on chain switch 253 is closed across the contacts 276 and 288, the relay coil 278 is dead by virtue of the table up limit switch 251 being open, the table down limit switch 252 is open, and relay coil 349 is dead.

The first operation before starting the cutter is to close the starting switch 250, exciting the relay coil 263, which will close the switch 400, completing the circuit from the main power lines 360, 361 and 362 through the blades 400a, 400b and 400c, through the lines 401, 402, and 403, to the motor 130. Also, the auxiliary switch 266 will be closed and held closed, thereby energizing the circuit through the line 264 from the line 262 through the normally closed stop push button 250a to the line 263. This motor 130 drives the transmission 131 through the chain belt 132 which overlies the sprockets 133 and 134. The belts 16 and 17 will be operated through the sprocket chain 150 which overlies the sprockets 151 and 152, which are respectively on the transmission 130 and on the shaft 153. Thus, the conveyor belts 16 and 17 are driven in the direction of the arrows adjacent thereto and the pulp will be delivered from the cutter to the fingers 70.

The shaft 145 is incidentally driven by the shaft 135 through the bevel gears 133 and 144, and the two eccentrics 147 and 148 cause the spacer shafts 122 and 123 to reciprocate and operate the spacers as previously stated. The shaft 135 is rotated through the chain belt 139 which overlies the sprockets 140 and 138 on the transmission 131 and the shaft 135 respectively.

With this much of the layboy in operation, the cutting and trimming machine 15 is started, and the pieces of pulp will be delivered therefrom to the conveyor belts 16 and 17, and thence onto the fingers 70. The fingers will lower by virtue of the fact that the finger clutch 173 is alive, as previously stated, driving the finger table lowering shafts 82. This is accomplished through the transmission 160 which is driven by the fan belt 161 which overlies the sprockets 162 and 163 which are respectively on the transmission 160 and the shaft 164 in the cutter. The chain belt 165 which overlies the sprocket 166 on the transmission 160 and overlies the sprocket 168, drives the short cross shaft 167 upon which it is mounted. The finger clutch 173 which is mounted on the cross shaft 208 is revolved by the chain belt 175 which overlies the sprockets 171 on the short cross shaft 167 and the sprocket 177 which is fixed on the finger clutch 173.

The finger table 78 lowers until the fingers are below the surface of the main table 28, at which time the finger table limit switch 230 will operate as follows: The shafts 226 and 227 will be rotated by the chain belts 222 and 223 which overlie the sprockets 224 and 225 on the table limit switch 230 and also overlie the sprockets 220 and 221 on the shafts 180 and 208 respectively. These shafts 226 and 227 are rotated in such a way as to move the blocks 241a and 241b upon which are mounted the finger table limit switches 238 and 239 towards each other. As these switches approach and contact each other, a stud 248 will contact the toggle 243 and the stud 249 will contact the toggle 242, simultaneously changing their position. The finger table limit switch 238 going to the up position across the contacts 294 and 300, and the table limit switch 239 going to the down position across the contacts 282, throwing the table limit switch 239 to the down position, causes the exciting of the relay coil 285 which closes the switch 417, thereby energizing the table clutch 172 and causing the main receiving table 28 to be lowered by revolving the shaft 180.

The lowering of the main receiving table 28 is accomplished through the chain belt 174 and overlies the sprocket 170 on the short cross shaft 167 and the sprocket 176 which is fixed to the table clutch 172. Since the finger table limit switch 238 has been thrown to the up position across the contacts 294 and 300, and the finger withdrawal limit switch 255 is closed across the contacts 291 and 296, the relay coil 298 is energized, which will close the switch 366 to complete the circuit to the motor 85 to withdraw the fingers. The finger withdrawal limit switch 255 is then thrown closing a circuit across the contacts 291 and 292. As soon as the fingers have withdrawn sufficiently to clear the pulp stacks, now carried on the main table, the finger clutch switch 257 is opened, disengaging the finger clutch 173, throwing the finger withdrawal limit switch 255 across the contacts 291 and 292, starting the finger table up.

During this time, the cut pulp has been laid on top of the stack which has been transferred to the main receiving table 28. The table continues to be lowered, and the stack height control 233 which driven by the table lowering shaft 180, is moved through its cycle. When the stack height control switch 233 closes, the time relay switch 320 is brought into operation by exciting relay coil 310. This relay coil 310 closes the auxiliary switches 330 and 312 and maintains the time relay circuit until the circuit is broken by the table limit switch 243. This excites the relay coil 335 which closes the switch 390 in the circuit to the motor 195, causing it to run the main receiving table 28 down and opens the auxiliary switch 286. By the opening of the auxiliary switch 286, the table clutch 172 is killed and starts the table down. The mechanical escapement mechanism 325 in the time relay switch 320 will operate the switch 321, which is normally closed, to an open position and close the switch 323 which is normally in open position.

When the switch 321 is open, the table down circuit is killed and, with the switch 323 closed, the relay coil 338 is energized which closes the switch 365 in the circuit to the motor 85 which extends the fingers 70. The fingers continue out until the finger out limit switch 256 is moved from the contacts 327 and 337 to the contacts 327 and 329. This kills the relay coil 338, which opens the switch 365 and starts the main receiving table 28 down again by exciting the relay coil 335. The main receiving table 28 continues down until the table limit switch 239 changes from up to down position. This also kills further action of the table clutch 172 by killing relay coil 285, which opens the switch 417. The table down limit switch 252 is opened slightly later by the coast of the table after the power has been cut off. When the table down limit switch 252 is closed, the relay coil 349 is energized provided there is pulp on the chains so that the pulp on chain switch 253 is closed across the contacts 279 and 282.

As soon as the pulp has been discharged, the pulp on chain switch 253 changes position, opening the circuit across the contacts 279 and 288 and closes a circuit across the contacts 276 and 278 and excites the relay coil 278 which will close the switch 391 in the circuit to the motor 195. This motor 195 then operates to elevate the main receiving table until the table up limit switch 251 is opened on the table, having reached its upper limit, or the table limit switch 230 being thrown by coming in contact with the finger table 78.

During the operation of the discharge of the stacks of pulp from the main receiving table 28 and the return of the table to its up position, the cut pulp is laid on the fingers, and the finger table is constantly lowered. Whenever the finger table and the main receiving table come in contact with one another, the table limit switch 239 goes from the up position to the down position, which is specifically from across the contacts 273 to the contacts 282, and the finger table limit switch 238 throws from the down to the up position, which is from the contacts 309 and 301 to the contacts 294 and 300.

This restarts the complete cycle. First the fingers withdraw and then return to their up position. At the same time, the table clutch closes and the table is driven from the cutter. While the fingers are withdrawn it is possible to rigidly lower the main receiving table 28 by closing the jog push button 258. This button energizes the relay coil 335 by virtue of the fact that the relay coil 271 is dead and the switch 347 is closed. When the relay coil 335 is energized, the auxiliary switch 286 is opened, and the switch 390 in the circuit to the motor 195 is closed, which drives the table down.

While the fingers are extended, the pressing of the jog push button 258 excites the coil 345 because the auxiliary switch 347 is open and the auxiliary switch 342 is closed. The auxiliary 347 is open and the auxiliary switch is closed because the relay coil 271 is alive, and it does not excite the relay coil 335, since the switch 347 is open. This drives the finger table down, but since the finger clutch 173 is engaged and the table clutch 172 is also engaged to a common shaft, the finger table down motor 200 drives the table down at exactly the same speed, maintaining a relative position of the two units unless the table is being driven down by its motor, in which case it is being lowered at a higher rate of speed than the finger table. The purpose of the jog push button 258 is to lower the height of the stack at a greater speed than it is being lowered by the automatic mechanism.

Having thus described my invention, what I claim as new therein and desire to secure by Letters Patent is:

1. The combination with means for the delivery of pieces of sheet material therefrom in succession, of a layboy comprising a main receiving table adapted to receive the material directly from the delivery means in a manner to build up a stack thereon, means for causing the said table to be lowered in accordance with the rate of building up of the stack, another table movable, without disturbing the delivery of material, into position to receive the material from the said delivery means for continued formation of the stack during a period of unloading of the main table, and means for causing the second table to be lowered in accordance with the rate of building of the stacks thereon.

2. The combination with means for the delivery of pieces of sheet material therefrom in succession, of a layboy comprising a main receiving table onto which said sheets of material may be received directly from the said delivery means in a manner to form a stack thereon, means for causing the said main table to be lowered in accordance with the building up of the stack, a finger table movable into the line of delivery of material to the main table to receive the material directly from the said delivery means for the continuation of the stacking thereof during a time interval for unloading the main table and for its return to receive the stack, means for causing the finger table to be lowered in accordance with the building up of the stack thereon, and means for retracting the finger table and for returning it to its initial position after its stack has been received by the main table.

3. The combination with means for the delivery of pieces of sheet material therefrom in succession, of a layboy comprising a main receiving table, means for supporting said table in position that said material will be received thereon directly from the delivery means to form a stack, means for causing the supporting means to lower the main table in accordance with the building up of the stack thereon, a finger table normally disposed laterally of the stack and movable into the line of delivery of material to receive the material for continuation of the stack formation, means for effecting an accelerated lowering of the main table to an unloading position, means for returning the main table upwardly, when unloaded, to position for lifting the stacked material from the finger table at any position of vertical travel of the latter and for then reversing the travel of the main table in accordance with the rate of stack formation, means for retracting the finger table when the load is thus lifted therefrom and means for returning it to its initial position.

4. The combination with means for the delivery of pieces of sheet material therefrom in succession, of a layboy comprising a vertically movable receiving table, means for causing said sheets of material, as received, to be deposited on the receiving table to form a stack, means under control of the stack for causing the lowering of said table at such rate as to maintain the top of the stack substantially at the same elevation, a vertically movable finger table carriage, a finger table horizontally movable thereon from a retracted position to an extended position at which latter position it temporarily receives the material for a continued formation of the stack, means operable incident to the extending of the finger table to receiving position for effecting an accelerated lowering of the main table to an unloading position, means for causing the finger table carriage to be lowered in accordance with the building up of the stack on the finger table, means for returning the main table from unloading position upwardly, to lift the stacked material from the finger table, and for then automatically reversing its direction to cause it to again be lowered in accordance with a continuation of the stack formation, means for retracting the finger table on its carriage when the stack is lifted therefrom, and means for returning the finger table carriage to initial position.

5. A device as in claim 4 wherein means is provided for an automatic unloading of the main table when it reaches its unloading position and an automatic return to load receiving position.

6. The combination with means for the delivery of pieces of sheet material therefrom in succession, of a layboy comprising a main receiving table, means for supporting said table in position that said material will be received thereon directly from the delivery means to form a stack, means for causing the supporting means to lower the main table in accordance with the building up of the stack thereon, a finger table normally disposed laterally of the stack and movable into the line of delivery of material to receive the material for continuation of the stack formation, means for effecting an accelerated lowering of the main table to an unloading position, means for returning the main table upwardly, when unloaded, to position for lifting the stacked material from the finger table at any position of vertical travel of the latter and for then reversing the travel of the main table in accordance with the rate of stack formation, means for retracting the finger table when the load is thus lifted therefrom and means for returning it to its initial position, and a conveyor belt disposed to receive the load thereon incident to the main table being lowered to unloading position, and means operable to set the conveyor belt in motion to convey the load from the machine.

7. A machine as recited in claim 3 wherein a transfer table is supported from and moves with the main table and wherein fixed supports limit the downward travel of the transfer table prior to the main table reaching its limit of downward travel, thereby to cause the transfer table to lift the stack from the main table for removal thereby from the machine.

GEORGE E. LAMB.